Patented Feb. 7, 1939

2,146,093

UNITED STATES PATENT OFFICE 2,146,093

METHOD OF PRODUCING CAUSTIC BORATE PRODUCTS

Charles F. Ritchie and Leroy G. Black, Trona, Calif., assignors to American Potash & Chemical Corporation, Trona, Calif., a corporation of Delaware Application February 17, 1936, Serial No. 64,250

15 Claims. (Cl. 23—59)

This invention relates to caustic borate products and to a process for producing same, and more particularly relates to the production of alkali borates from borax and sodium carbonate. The alkali borates produced by the process consist, first, in different fused products containing a ratio of $Na_2O/B_2O_3$ of from 1/1 to 3/1. The process also includes a method of crystallizing the alkali borate, sodium metaborate $Na_2B_2O_4$, by using the fused sodium borates.

Sodium metaborate has been found to be a useful compound in many arts. It is useful in detergents and washing compounds, in the manufacture of glasses and enamels, etc., in the treatment of citrus fruit for cleaning same and preventing subsequent mold thereon, as a photographic developing agent, etc. Other sodium borates more alkaline than sodium metaborate are valuable for like purposes.

The present invention has for its object, first, the production of alkali borates more alkaline than sodium metaborate ($Na_2B_2O_4$), such borates being referred to as caustic borates, and may be thought of as mixtures of $Na_2B_2O_4$ and free $Na_2O$. It is a further object to provide an economical process for producing sodium metaborate in the crystalline state from the caustic borates more alkaline than sodium metaborate. It is also an object to produce carbon dioxide gas, and also to produce liquid caustic solutions containing some borate.

When sodium carbonate $Na_2CO_3$ is fused with commercial borax, $Na_2B_4O_7.10H_2O$, in the proportions of one mol of sodium carbonate to one mol of borax, sodium metaborate in a fused state is produced, while carbon dioxide and water are liberated in accordance with the following reaction:

$Na_2B_4O_7.10H_2O + Na_2CO_3 =$
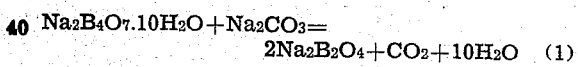    $2Na_2B_2O_4 + CO_2 + 10H_2O$    (1)

By the process of the present invention the reaction may be carried even farther than is shown above, and the resulting product has advantages where borates more alkaline than metaborate are desired, and has a further special advantage of providing the starting material by which an economical process of producing sodium metaborate in the crystalline state and, if desired, a strong caustic liquor may be practiced. We have found that under controlled conditions, as hereinafter set forth, the thermal reaction between borax and sodium carbonate may be carried out to produce products having ratios of $Na_2O/B_2O_3$ greater than 1/1. Such reactions may be expressed, for example, as follows:

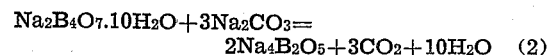
$Na_2B_4O_7.10H_2O + 3Na_2CO_3 =$
    $2Na_4B_2O_5 + 3CO_2 + 10H_2O$    (2)
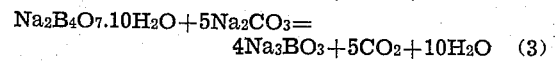
$Na_2B_4O_7.10H_2O + 5Na_2CO_3 =$
    $4Na_3BO_3 + 5CO_2 + 10H_2O$    (3)

Figure 1:
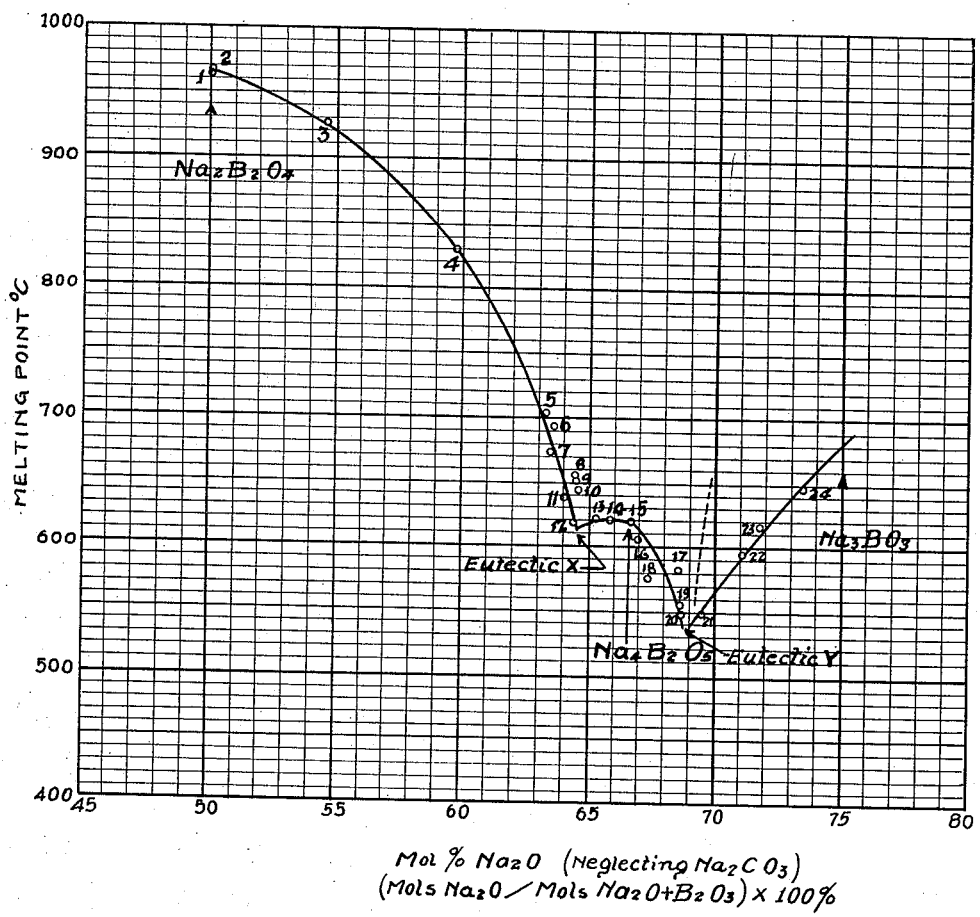

While the foregoing Equations (2) and (3) indicate that the reaction is stoichiometric, i. e. that all of the sodium carbonate reacts with the borax to produce a caustic borate, such is not always the case in actual practice. Under the commercial conditions used by the present inventors, the reactions of the equations would not go entirely into completion, but would produce a melt containing sodium carbonate and a borate more alkaline than sodium metaborate. In order to facilitate plotting and description of such mixtures, we have chosen to express the analyses of the same in terms of unreacted sodium carbonate ($Na_2CO_3$), sodium metaborate ($Na_2B_2O_4$) and "free" or excess sodium oxide ($Na_2O$). In the instance of Figure 1, we have plotted melting temperatures against the "mol per cent of $Na_2O$ (neglecting $Na_2CO_3$)", i. e., in this instance, the free $Na_2O$ plus the $Na_2O$ of the sodium metaborate is plotted against the melting temperature.

We refer now to Figure 1, which is of considerable value to an explanation of the present invention and sets forth certain of our novel features and discoveries. The curve of Figure 1 was made from data obtained in the following manner: Mixtures of borax and sodium carbonate were melted in a suitable container and the solidification points of the melts were determined. It will be noted that as the mol percentage of reacted $Na_2O$ increased, the melting points of the mixtures decreased. It should likewise be noted for future reference that all of the melting points lie quite well upon the curve.

One feature which we have discovered is the eutectic between sodium metaborate ($Na_2B_2O_4$) and sodium orthoborate ($Na_4B_2O_5$), shown as "eutectic X" on Figure 1. This eutectic to our knowledge has never been reported in the literature. It lies between points 12 and 13 on the curve of Figure 1, being represented by a composition containing about 64.7 mol per cent $Na_2O$ and melting at about 610° C.

As the fraction of $Na_2O$ is increased, it will be seen that the melting point of the mixtures increase slightly until the composition of the orthoborate is reached, i. e., at 66.7 mol per cent $Na_2O$, after which the melting points again decrease. To our knowledge, the existence of this compound has not heretofore been reported. We have discovered a second eutectic residing in the neighborhood of about 69 mol per cent $Na_2O$ and melting at about 535° C., shown in Figure 1 as "eutectic Y". This eutectic comprises one between sodium carbonate and a caustic borate. These discoveries are new, and are of value in the production of caustic borates from borax and sodium carbonate by our methods of fusion. The curve of Figure 1, defined by points 21—22—23—24, represents melts containing a solid phase of sodium carbonate, together with a caustic borate having a free-$Na_2O$/$Na_2B_2O_4$ molecular ratio greater than 1.25.

Figure 2:
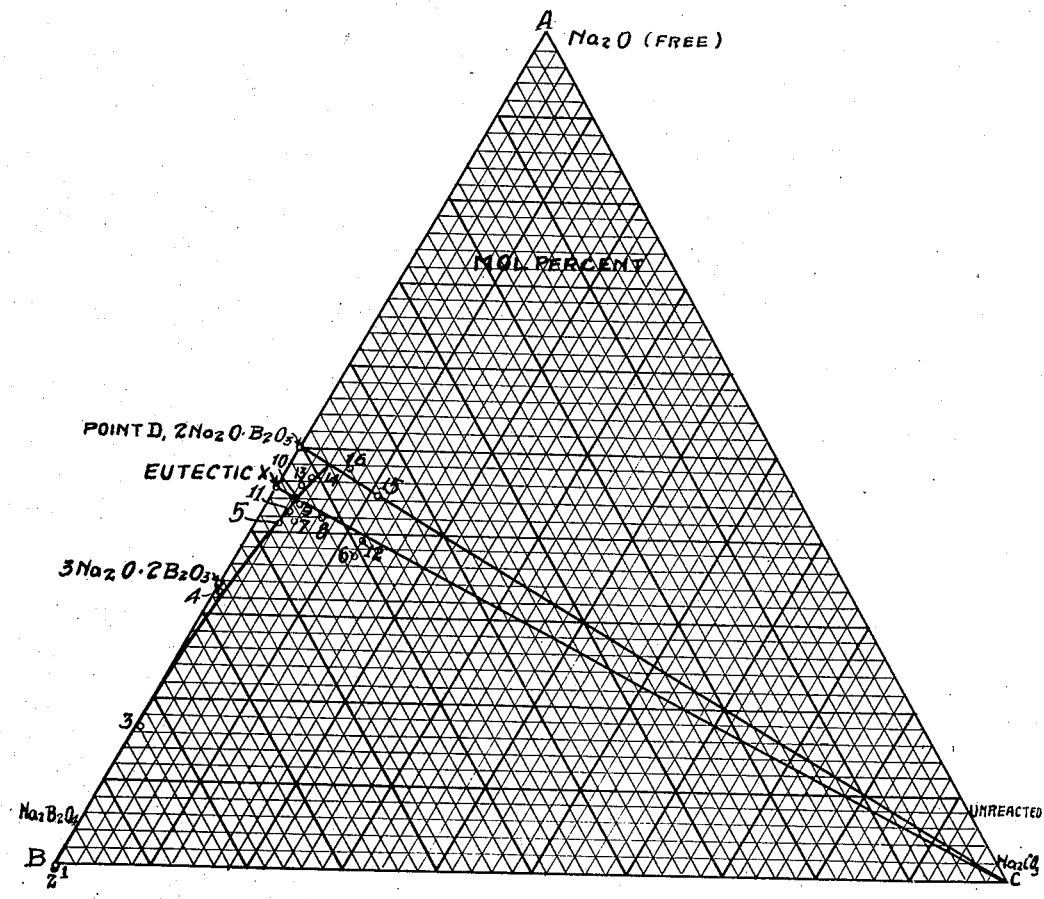

Referring now to Figure 2, which comprises the well known trilinear plot,—in the customary manner, point A represents 100% free-$Na_2O$, point B represents 100% $Na_2B_2O_4$, and point C represents 100% unreacted $Na_2CO_3$, all values being molecular ratios or molecular percentages. Sodium orthoborate, for instance, which is expressed in these terms by equimolecular proportions of free-$Na_2O$ and $Na_2B_2O_4$, lies on the line A—B at the mid-point. This mid-point is shown on Figure 2 as point D. By joining joint D with point C we obtain a line representing compositions having an equal ratio of $Na_2O$/$Na_2B_2O_4$ containing varying proportions of unreacted $Na_2CO_3$.

The numbered points on the plot, Figure 2, correspond with the numbered points of the curve of Figure 1. Curve 1—15 of Figure 1 shows the melting points of mixtures from practically pure $Na_2B_2O_4$ to mixtures containing $Na_2B_2O_4$ and free $Na_2O$ in the approximate proportion to give $Na_4B_2O_5$, which mixtures also contain varying amounts of unreacted sodium carbonate, while Figure 2 shows the compositions of such points. It is one of our discoveries that the presence of unreacted sodium carbonate in such a range of mixtures does not materially affect the melting points of the system. This is of vital importance to a process which has for its end the manufacture of caustic borates by fusing borax and sodium carbonate. As a result of this discovery, it may be said that fusions may be made between borax and soda ash, which fusions may contain as high as 12 mol per cent of unreacted $Na_2CO_3$ without materially affecting the melting point of the resulting borate compound itself.

It is often difficult under commercial conditions to bring about a complete reaction between soda ash and borax, which reaction will result in the liberation of all of the $CO_2$. In order to force the reaction to the right, i. e., to produce the desired caustic borate, it is desirable to maintain in the melt an excess of sodium carbonate. As a further consideration, it is desirable that such mixtures should melt at a low temperature in order to allow these reactions to be carried on with ease, and in commercial furnaces. Our discovery that this can be done, i. e., that a very appreciable excess of unreacted sodium carbonate may be maintained in the melt at least up to the point where the free-$Na_2O$/$Na_2B_2O_4$ ratio is about 1.25 (eutectic Y), while continuing to lower the melting point of the mixture, is of material value to the art.

The curve 1—14 of Figure 2 has been sketched in as representing the practical optimum reaction conditions as hereinafter set forth in this specification. That is to say, for example, melts of caustic borates may be produced which contain equal molecular proportions of free-$Na_2O$ and $Na_2B_2O_4$ with unreacted sodium carbonate as low as four mol percent. While such a caustic borate, or one containing somewhat less free-$Na_2O$, may at times be produced to contain greater quantities of unreacted sodium carbonate, the latter conditions are not deleterious to the melting operations, and the carbonate containing product may be used successfully in the subsequent steps of this process.

Figure 3:
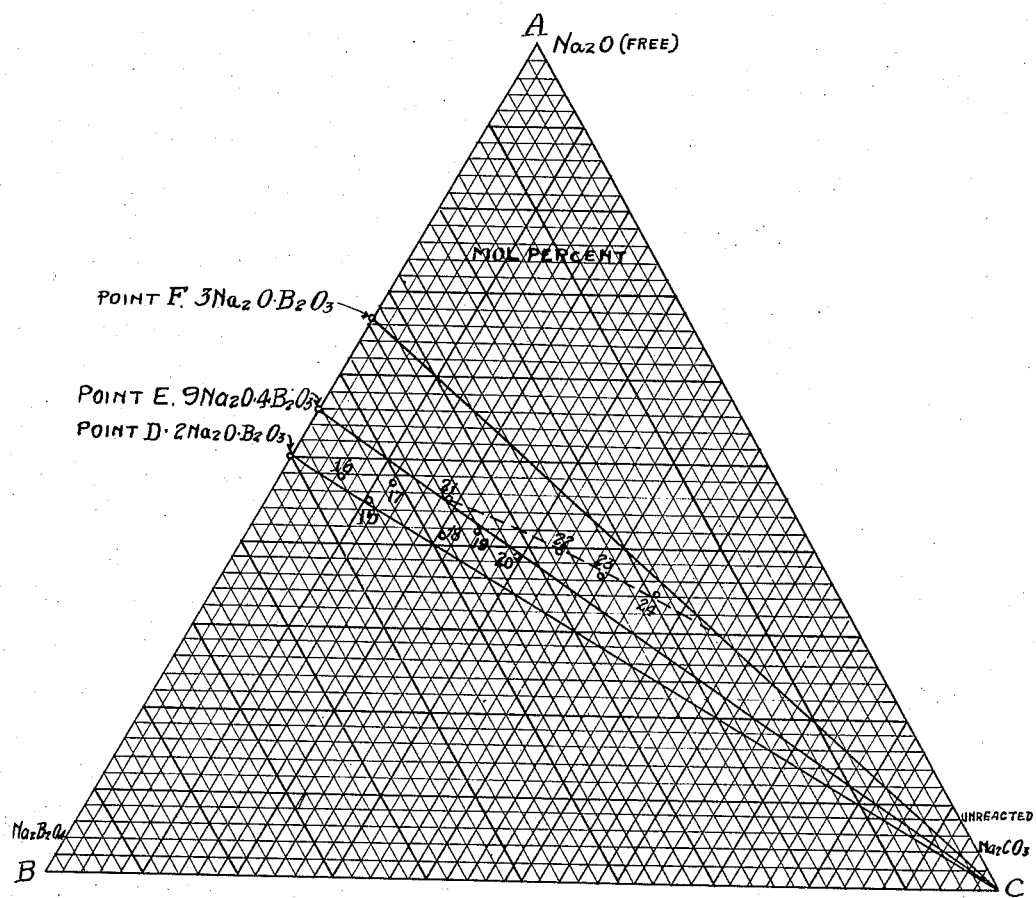

Mention is now made of Figure 3 which correlates the data of Figure 1, from points 15 to 24, with the compositions. We have found that liberation of carbon dioxide from mixtures of borax and soda ash can be accomplished by the process of this invention quite successfully and fairly completely up to the point where the ratio of free-$Na_2O$/$Na_2B_2O_4$ is unity. Beyond this point and under commercial conditions of operations, we have found that the reaction can be carried further but that a greater excess of sodium carbonate must be maintained. Carrying this reaction further involves two sections of the curve of Figure 1. The first section is represented by the curve 15—20 of said Figure 1, wherein the ratio of $Na_2O$/$Na_2B_2O_4$ is being increased but wherein the melting point of the mixture is decreasing. These points 15—20 are shown in Figure 3 as lying within the narrow band bounded by the lines D—C and E—C.

The point E on Figure 3 represents the composition containing no sodium carbonate, wherein the ration of free-$Na_2O$/$Na_2B_2O_4$ is 1.25. This has been indicated as corresponding with a composition $9Na_2O.4B_2O_3$. As previously explained, point D corresponds with a compound having a free-$Na_2O$/$Na_2B_2O_4$ ratio of unity, which corresponds with the compound $2Na_2O.B_2O_3$, i. e. orthoborate.

In this section of the field, apparently sodium carbonate has a fairly marked tendency toward lowering the melting point of the mixtures, and this phenomenon continues down to the point wherein there is present in the final melt about 30 mol per cent of $Na_2CO_3$, unreacted. If unreacted sodium carbonate in excess of this 30 mol per cent is allowed to be present in the mixture, the melting point again rises rapidly very much, as shown by the dotted construction in Figure 1. Therefore, we claim as one of our discoveries and set forth as a part of this invention, the control of the mixture and the melt with respect to this feature, that it is well to limit the quantity of unreacted sodium carbonate to 30 mol per cent in melts whose $Na_2O$/$B_2O_3$ ratios lie within the bands D—C and E—C, if efficiency and minimum melting temperatures are desired.

The portion of the curve 21—24 of Figure 1 has been transferred to Figure 3, and is shown as the broken line lying above the division line E—C in Figure 3. This curve represents compositions of melts having a solid phase of $Na_2CO_3$, together with a caustic borate liquidus. It may be seen that the ratio of free-$Na_2O$/$Na_2B_2O_4$ increases slowly along this curve and that the curve 21—24 intersects the line F—C a short distance beyond point 24. This point of intersection represents a mixture containing about 50 mol per cent of unreacted $Na_2CO_3$ and the caustc borate having a ratio of free-$Na_2O$/$Na_2B_2O_4$ of 2 to 1, i. e., an $Na_2O$/$B_2O_3$ ratio of 3/1. Incidentally, point F represents this mixture (2/1), free of sodium carbonate, and corresponds with the composition $3Na_2O.B_2O_3$. Under practical conditions of heating and furnacing, this mixture containing an $Na_2O$/$B_2O_3$ ratio of 3/1 is about as far as the reaction between borax and soda ash can be carried commercially. However, the entire data of the curve or line 21—24 is new and teaches the production of more caustic borates than have heretofore been reported. As will be seen in the further exposition of this invention, the excess sodium carbonate is not deleterious, and the resulting product is of value to the present process.

While the present invention is described as involving a reaction between borax and soda ash, it is obvious that as the conversion proceeds the reaction is in reality one between a caustic borate and soda ash to produce a more caustic borate. More explicitly, a composition such as is expressed by eutectic X, Figure 1, may be produced by furnacing soda ash and sodium metaborate. In fact, in one variation of the present invention, such a procedure is contemplated.

In the commercial working of this invention, the operator is faced with a necessity of striking a compromise between high conversions and working temperatures. As temperatures increase, both the rate and the degree of reaction increase. On the other hand, as the temperature of the furnace is increased, the life of the furnace decreases and other operating difficulties increase. As a result, it is usually desirable to bring about the reaction between soda ash and borax at the lowest possible temperature. Throughout this disclosure we have attempted to set forth the lower temperatures at which satisfactory results may be obtained, rather than the highest temperatures. Likewise, in future examples, average or usable conditions of conversion, etc., have been set forth, rather than the maximum or optimum conditions.

The melts depicted by points 1—16 of Figures 1 and 2 were carried out at temperatures ranging from 915° C. to 1020° C. Point 6, for example, which in Figure 2 shows a considerable quantity of unreacted sodium carbonate, resulted from the 915° C. melt,—point 13 which shows a high conversion and but very little unreacted $Na_2CO_3$, at 1020° C. In general, it may be said that this temperature range is satisfactory for the production of caustic borates, as herein described, as represented by compositions shown in Figure 2. More particularly, said temperatures represent a good working range for production of caustic borates having a free-$Na_2O/Na_2B_2O_4$ ratio up to unity.

The same temperature range may be said to be satisfactory for the portion of the curve (Figure 1) 15—20. The points in Figure 1 and also in the band bounded by D—C—E of Figure 3 were made at temperatures ranging from 950° C. to 1000° C. In this band the higher temperature is desirable for forcing the reaction more completely to the right and also for expediting it with respect to time.

Coming now to the right-hand curve 21—24 of Figure 1, and also the broken curve, we have found that the temperature of 950° C.–1000° C. is not sufficient to bring about appreciable further reaction between sodium carbonate and borax (or, more truly, with the alkali borate having a composition $9Na_2O.4B_2O_3$). The broken line represents mixtures of increasing amounts of sodium carbonate which were heated in the neighborhood of 950° C.–1000° C., resulting simply in melts containing practically the same molecular ratios of free-$Na_2O/Na_2B_2O_4$, but with increasing melting points, due to the presence of the unreacted sodium carbonate. In order to bring about further decomposition or reaction, it was necessary to apply considerably higher temperatures. The points 22, 23 and 24 of Figures 1 and 3 were produced by melts which were heated to 1050° C., or somewhat higher. We have found that high temperatures are both necessary and advantageous in forcing this reaction materially beyond the point of this eutectic Y, between the caustic borate and sodium carbonate. Referring to Figure 3, in order to produce caustic borate mixtures lying above the line E—C, it is recommended to heat the mixtures to at least 1050° C. We have found that even higher temperatures are advantageous in this respect. Mixtures containing a free-$Na_2O/Na_2B_2O_4$ ratio of 2/1, i. e., compositions along or near the line F—C, which mixtures contain less than the previously indicated 50 mol per cent of unreacted sodium carbonate, can be obtained if the mixtures are furnaced at higher temperatures, and we include within the scope of this invention such melts and such mode of procedure. However, we are frank to admit that whenever possible, we prefer to work at the lowest possible temperature, due to the practical difficulties hereinbefore mentioned.

This production of fused sodium borates having a greater alkalinity than sodium metaborate is dependent, in part, upon the control of the atmosphere above the fused product, as hereinafter pointed out, and upon temperature. Within the working ranges heretofore set forth, fused borax products bearing an alkalinity from above a ratio of $Na_2O/B_2O_3$ of 1 to 1 to a ratio of $Na_2O/B_2O_3$ of 3 to 1 may be produced by the process. As the alkalinity of the final product is increased from the ratio of $Na_2O/B_2O_3$ of about 1 to 1 to a ratio of 3 to 2, fused products are produced in which substantially all of the sodium carbonate in the fused mixture has been decomposed, so that the resulting product contains practically no free sodium carbonate. (See Figure 2.) The production of borates more alkaline than represented by a ratio of $2Na_2O/B_2O_3$ requires the addition of an excess of sodium carbonate, and the final fused product contains, in addition to the caustic borate, undecomposed sodium carbonate. The resulting product of the process has special advantages not only because of its extraordinarily high ratio of alkali to borate, but because of its relatively low melting temperature. Furthermore, as hereinafter pointed out, the higher the ratio of $Na_2O$ to $B_2O_3$ in the fused caustic borate, the better the material is for the production of crystalline sodium metaborate by the process hereinafter pointed out.

In the production of hydrated sodium metaborate by the process of the present invention the fused caustic borate is first dissolved in water, or a mother liquor from the process, at a high temperature and then cooled to crystallize out the sodium metaborate, preferably in the form of octohydrate crystals, $Na_2B_2O_4.8H_2O$. Borax may be added to the solution to neutralize the caustic borate to metaborate.

An important advantage of the process of the present invention is that by the operation thus described only a part, in some cases as low as 20% of the borax ($Na_2B_4O_7.10H_2O$), which is to be converted into metaborate ($Na_2B_2O_4XH_2O$), has to be subjected to fusion reaction with the sodium carbonate. We thereby eliminate the cost of fusing a large portion of the borax, together with the cost of dehydrating this borax or evaporating from it its water of crystallization.

Various further objects and advantages of the present invention will be understood from a description of a preferred form or example of a process embodying the invention and of the products resulting therefrom.

In producing caustic borates having a high ratio of $Na_2O/B_2O_3$, the process proceeds as follows: It is necessary, if these high ratios are to be realized, that the melting, or at least the final portion thereof, be conducted in an atmosphere which has a low content of carbon dioxide. If it is so desired, the proper mixture of borax and soda ash may be given a preliminary melting in a direct-fired furnace wherein a reaction between the soda ash and the borax takes place, liberating, say, ½, ⅔, or more, of the total liberatable $CO_2$. This mixture may then be allowed to run into an indirect fired furnace of any suitable design wherein the heating is continued for a period, say of two hours, while an atmosphere low in $CO_2$ is maintained above the molten mass. In this manner an alkali borate containing a high ratio of $Na_2O/B_2O_3$ is produced. Obviously, if it is not desired to conduct the process continuously, as would be the case in the above example, the reaction may be carried out as a batch process by first heating under conditions wherein there is first maintained a high partial pressure of $CO_2$, which is later decreased and finally reduced to a very low point. Under such conditions the gas which is first liberated is very high in carbon dioxide, and may be utilized to advantage in other processes. Another alternative which may be (used if it is so desired to construct the furnace and auxiliary equipment in such manner) is that the whole process may be carried out under conditions of low partial pressure $CO_2$. Such equipment has the advantage that the reaction is hastened (other conditions being equal), to the maximum degree.

For simplicity of nomenclature, we shall refer to alkali borates containing a ratio of $Na_2O/B_2O_3$ greater than 1 to 1 as caustic borates. While the present invention is described in terms of sodium borates, its application and usefulness is not to be construed to be so limited. Other alkali borates, either pure or mixed, may be produced by the process of this invention.

The caustic borate product is removed from the furnace in a molten condition and may be subsequently treated according to the use it is to be put. It may be cast into ingots, ground and sold for purposes wherein a caustic borate is desired. It may be cast upon a continuous steel belt, or a cooled rotary drum and subsequently scraped off to produce a flake or chipped product for commercial use.

In one preferred form of this invention the product is dropped into water or a suitable mother liquor for use in the manufacture of hydrated sodium metaborate. This action of dropping it into the water or mother liquor tends to disintegrate the material and to bring about rapid dissolution, both by virtue of said subdivision and the consequent heating of the liquor.

In one form of our invention, especially as it is applied to this last-named alternative, it is not absolutely necessary to carry the reaction between soda ash and borax to the fullest possible extent, as indicated in Equation (3). Somewhat less soda ash may be mixed with the original borax prior to the furnacing, producing a product which will have a ratio of $Na_2O/B_2O_3$ of somewhat less than 2 to 1. When resort is had to this modification, it is not necessary to maintain a large excess of soda ash, nor to reduce the partial pressure of carbon dioxide in the melting furnace or furnaces to such a low degree. Whatever product is made for subsequent use in this process, or as a product per se, depends, of course, upon various economic factors, equipment available, purities demanded, etc.

One of the valuable adjuncts of this invention is the production of a rich carbon dioxide gas which may be employed advantageously in other industries. We have found that carbon dioxide produced by one or more of the modifications of the present invention is advantageous, as compared with $CO_2$ from other sources. For example, being produced under strong heat, volatile organic matters, which are present in $CO_2$ produced from lime kilns, fermentation, etc., are absent. To assure this, we prefer to add to the mixture of borax and soda ash passing to the smelting zone a small quantity of suitable oxidizing agent, such as sodium nitrate, sufficient to combine with whatever small amount of organic matter that may have existed in the original raw materials. Such oxidizing agent serves to oxidize the organic matters, aiding in producing the desired carbon dioxide purity and at the same time whitening the molten effluent.

Carbon dioxide is of value in many of the arts, for use in dry ice manufacture, or "bottled" for use in carbonating beverages, a rich gas, free of organic matters, such as hydrocarbons, etc., and free of odors, taste, and diluent gases, is desired. To the end of utilizing the present process for such production, we prefer to conduct the melting in a closed system.

In many instances, a gas containing 50% more or less of carbon dioxide is quite satisfactory in the arts. Such a gas may be of value in carbonation operations in the chemical industries, such, for example, as in the production of sodium bicarbonate. The gas produced from open furnacing of our mixtures of borax and soda ash has been found to be markedly superior to ordinary flue gas with respect to its $CO_2$ content and may be employed advantageously in such processes.

We will now describe and give a specific example of the operation of one of the forms of this invention wherein hydrated sodium metaborate is produced. The caustic borate, which may contain appreciable quantities of unreacted sodium carbonate, is utilized in this step for the production of hydrated sodium metaborate. In this variation, this caustic borate is dissolved in water or mother liquor and the solution neutralized with borax, producing a solution of sodium metaborate from which the suitable hydrate may be crystallized. In keeping with our intention to describe this invention in its practical aspects rather than to set forth extreme conditions, we employ an example of a caustic borate whose $Na_2O/B_2O_3$ ratio is about 1.8. Specifically, referring to Figures 1 and 2, we employ a product represented by point 12. This was a fairly low melting-point product, approaching the composition of eutectic X, which contained 48.6 mol per cent $Na_2B_2O_4$, 39.4 mol per cent free $Na_2O$ and 12.0 mol per cent unreacted $Na_2CO_3$. This melt was made by furnacing for about an hour at 950° C., an original mixture of borax and soda ash which contained about 3.1 mols of $Na_2CO_3$ per mol of borax.

The molten material from the melting furnace is preferably, as hereinbefore stated, dropped into a mother liquor which originates in this cycle of operations. This caustic borate is caused to react with a sufficient quantity of borax so that there is produced a hot concentrated solution from which there may be crystallized the desired hydrated sodium metaborate. This hot, concentrated solution is then cooled to a suitable temperature for the crystallization of the sodium metaborate. If the most common form of sodium metaborate, namely, the octohydrate, $Na_2B_2O_4.8H_2O$, is desired, the crystallization is caused to take place, or at least to be completed, at temperatures below the transition temperature of $Na_2B_2O_4.8H_2O$-$Na_2B_2O_4.4H_2O$, which resides in pure solution at about 50°–53° C. In fact, we have found that temperatures of 20°–35° C. are quite suitable for this crystallization.

As an illustration of our cyclical crystallization steps for converting the caustic borates into the hydrated metaborate, we submit the following: The caustic borate, approximately represented by point 12, had a weight percentage composition, neglecting minor impurities, viz:

| | Per cent by weight |
|---|---|
| $Na_2B_2O_4$ | 63.3 |
| $Na_2O$ | 24.1 |
| $Na_2CO_3$ | 12.6 |

24,440 pounds of this caustic borate is added to 214 tons of mother liquor at about 35° C., which mother liquor contains about 19.9% $Na_2CO_3$, 15.9% $Na_2B_2O_4$ and about 64.2% $H_2O$, neglecting minor impurities. With the caustic borate there is added 36,250 pounds of dekahydrate borax and 3,330 gallons of water. This water is added to provide crystal water for the products, and may consist wholly, or in part, of wash water from a subsequent step. The resulting mixture when maintained at about 50° C., or slightly higher, dissolves all of the borates and the "free-$Na_2O$", and precipitates the 3,080 pounds of $Na_2CO_3$, which was contained with the caustic borate, as sodium carbonate monohydrate. Higher temperatures of heating are not deleterious. This precipitated carbonate is removed from the hot solution and may be returned to the fusion steps of the process. The clear, hot liquor is then cooled to 35° C. and a crop of sodium metaborate octohydrate

$(Na_2B_2O_4.8H_2O)$ precipitated. The crystal crop is separated from the cold mother liquor in any suitable equipment, and the liquor returned to the cycle. The crystals may be washed to remove adhering mother liquor, said wash water being returned to the cycle, the metaborate contained therein being thereby salvaged. A yield of 84,800 pounds or 42.4 tons of octohydrate metaborate is produced.

Of the boron in this 42.4 tons of product, the boron of only 16.2 tons entered the crystallization cycle with the caustic borate from the furnacing operations. The boron of the greater portion of the product, 26.2 tons, originated directly from the raw unprocessed dekahydrate borax added in the neutralizing operations.

In this example, we have elected to illustrate the removal of the unreacted sodium carbonate, producing hydrated sodium metaborate free of any solid phase of $Na_2CO_3$. However, for certain purposes a moderate contamination with respect to $Na_2CO_3$ is not objectionable, and in such instances we may forego the step of removing the same. The elimination of sodium carbonate from the hot liquor is made possible through our discovery that $Na_2CO_3$ is less soluble in the hot concentrated metaborate liquor than in the cold mother liquor, solubilities being expressed in grams per 100 grams of water. In fact, the cyclical 35° C. mother liquor above quoted was found to be unsaturated with respect to $Na_2CO_3.H_2O$.

The solubility of sodium carbonate has been found to be even less in the hot liquor prior to the addition of the neutralizing agent, borax. To obtain even a lower concentration of $Na_2CO_3$ in the system from which the hydrated metaborate is crystallized, the carbonate removal step may be practiced after adding the caustic borate to the mother liquor, but before neutralization with borax and/or addition of the specified water.

While the foregoing illustration utilized a caustic borate approximately expressed by point 12, we wish to be understood that more alkaline borates, such as those expressed by points 21—24, may be used to advantage.

The crystallization of the hydrated metaborate may be carried out in a variety of crystallizers and in a variety of manners, according to the exact product which is desired. A crystallizer, such as the Swenson-Walker type, may be employed, or vacuum crystallizers, such as are described in United States Letters Patent No. 1,997,277, assigned to the American Potash & Chemical Corporation, may be used to advantage for the production of large crystals, the latter form being especially efficacious. In conducting the crystallization for the production of large crystals, a certain quantity of seed is first generated or added to the batch which has been cooled (preferably by vacuum), to essentially the saturation point, and the cooling conducted at such a rate that the metaborate in solution is caused to deposit, for the most part, upon the seed crystals already present. Vacuum coolers, such as are described in the aforesaid patent, are especially desirable for this purpose, due to the fact that they are free from mechanical abrasion effects, which normally bring about the spontaneous generation of nuclei. Vacuum cooling is further desirable in that it does not result in deposits of crystals upon the cooling surface, the liquid-vapor interface being the cooling surface. If more finely divided crystals are desired, these are produced by cooling the batch rapidly, under vacuum, if desired, without resorting to the formation of a controlled or predetermined crop of seeds and/or without controlled cooling. That is to say, if finely divided crystals are desired, the cooling is carried on rapidly. One method of doing this is by uncontrolled flash, evaporative cooling.

The crystals which are produced by a suitable cooling procedure are separated by any suitable means, such, for example, as a vacuum filter or a centrifugal machine. If desired, they may be given a wash on the filter or in the centrifugal basket with water or other suitable solution or solvent, after which they may be dried and otherwise prepared for marketing.

Due to the abstraction of water by virtue of vacuum cooling, also by virtue of the water of crystallization of the sodium metaborate, and also due to the loss of water incurred when the molten caustic borate is poured into the mother liquor, this addition of wash water does not increase the volume of the solution in the closed crystallization cycle. In case minor impurities accumulate in the system, the mother liquor is subjected to suitable refining means whereby such impurities are removed. The mother liquor which results from the foregoing crystallization is now ready to be used again for the purpose of producing more hydrated sodium metaborate.

Several variations of our process may be practiced in converting the caustic borate into hydrated sodium metaborate. For example, the caustic borate may be dissolved directly in the mother liquor, or in water. We have found that compounds more alkaline than the metaborate are not stable in contact with water, i. e., they do not form congruently saturated solutions, and, as a result, hydrated sodium metaborate may be crystallized from a solution which, to all intents and purposes, contains considerable free Na₂O. The mother liquor with its dissolved caustic borate, preferably heated to a relatively high temperature so that it will produce a considerable quantity of hydrated sodium metaborate upon cooling, may be filtered for the removal of extraneous or foreign matter. We have found that many impurities, notably sodium carbonate, are relatively insoluble in hot, strongly alkaline solutions and may be removed at this point.

In case hydrated sodium metaborate is the sole solid product desired of this process (i. e. if the process is to be purely cyclical), borax is continually added to the liquor to neutralize the excess caustic, thereby maintaining the composition of the solution within the field of stability of the desired hydrated sodium metaborate. For example, if the caustic borate which is being produced in the fusion furnace contains a ratio of Na₂O/B₂O₃ of 2, then we add to the system 2 mols of B₂O₃ (in the form of 1 mol of Na₂B₄O₇ in any suitable form) per mol of B₂O₃ in said caustic borate. After filtering the solution, if required, the octohydrate of sodium metaborate may be crystallized at the correct temperature, the composition of the solution being such that the said salt will crystallize out.

This feature of our invention is of very considerable commercial value. By this method of operation, when producing a caustic borate having an Na₂O/B₂O₃ ratio of 2.0, it has been necessary to furnace only one-third of the total B₂O₃ which is finally produced in the form of hydrated sodium metaborate; if the caustic borate is produced with a ratio of 1.8, the economy is still manifest, only 37% of the total B₂O₃ has to be furnaced. Since the commercial form of borax is Na₂B₄O₇.10H₂O, the furnacing of the total quantity of boron entails driving the water from the total of the boron compound so utilized. Since a hydrated sodium metaborate is desired, this driving off of water from the borax, which water must be subsequently returned to the system for formation of the hydrated sodium metaborate, constitutes an enormous economic waste. By the improved process of this invention a very greatly reduced proportion of the water of the original borax has to be driven off with heat under such wasteful conditions.

It is to be understood that the process of this invention is not necessarily limited to the production of a caustic borate having the aforedescribed ratio of Na₂O/B₂O₃ of 2, but also applies to the production of caustic borates containing ratios of Na₂O/B₂O₃ of between 3 and 1, and, if desired, to the conversion of all such caustic borates into hydrated sodium metaborate. Another practical advantage of the present process for the production of hydrated sodium metaborate resides in the fact that close chemical control of the several steps is unnecessary. The process is not exacting as to definite or fine mixing of the soda ash and the tetraborate entering the fusion zone. Furthermore, the "neutralization" cycle is not critical, since the field of stability of sodium metaborate covers a wide range of ratios (in the solution) of Na₂O/B₂O₃. Of course, if hydrated sodium metaborate is the sole product of the wet process, i. e. if the process is cyclical, the neutralizing agent, borax, must on the average be added in the indicated stoichiometric quantities:

$$Na_4B_2O_5 + Na_2B_4O_7.10H_2O + 14H_2O = 3Na_2B_2O_4.8H_2O \quad (4)$$

Material "overneutralization", i. e. addition of borax to produce a solution having a ratio of B₂O₃/Na₂O, appreciably in excess of unity, is not recommended. Excess NaOH in solution may be tolerated to better advantage; but this should not be carried to an extreme, as the viscosity of the liquor increases as the free Na₂O(NaOH) increases. For example, in crystallizing the octohydrate metaborate, mother liquors at 35° C. should not be allowed to contain over 15% free Na₂O.

While we have just described a suitable crystallization cycle for producing octohydrate sodium metaborate from furnaced melts; it must be understood that the process of the present invention is not to be limited strictly to such a cycle. For example, the melt, after solidification and comminution may be fed into an agitated tank wherein, by cooling, the solution is maintained at the desired low temperature, and the octohydrate metaborate caused to crystallize. Borax, as a neutralizing agent, may be added as needed, according to the precepts of this disclosure. Other variations are apparent to those skilled in the art.

If the less common form of hydrated sodium metaborate, the tetrahydrate, Na₂B₂O₄.4H₂O, is desired, this may be obtained by proceeding along the lines hereinbefore set forth, except that either the temperature of crystallization or the free Na₂O(NaOH) concentration should be raised. If the solution is fairly free from "impurities", the tetrahydrate will require a crystallization temperature above about 50° C. At 35° C. the tetrahydrate may be crystallized if the free Na₂O content is maintained between about 15% and 30% (or somewhat more) in the liquor. However, the latter values make the system harder to handle, due to the high viscosities of the liquors, their strongly alkaline nature, and the danger of crystallizing free NaOH with the hydrated sodium metaborate.

The excess or free NaOH may be generated within the liquor according to the precepts of this invention. In fact, it is one of the objects and advantages of our invention to produce a liquor high in free NaOH (and containing certain quantities of borate) which liquid caustic may find valuable application in other processes, all of which are not disclosed herein, being novel and subject to further protection by Letters Patent.

As aforedescribed, when the caustic borate of this invention is placed in water it can not form a saturated solution without first decomposing and depositing a less alkaline borate, $$Na_2B_2O_4.8H_2O$$

or Na₂B₂O₄.4H₂O, according to the temperature. This is another way of saying that the caustic borate compounds of our invention do not exhibit a congruent field of stability. The hydrated salt of Na₄B₂O₅ is only stable in solution when the total Na₂O in the solution is about 40 to 50%. Under such conditions, the total B₂O₃ in solution varies from 2 to 6%, according to temperature.

We take advantage of this phenomenon in producing from the caustic borate of our invention a crop of hydrated sodium metaborate and a solution strong in free NaOH. To achieve this, the caustic borate is placed in water. If so desired, the octohydrate may be crystallized from the solution up to the point where there exists in the mother liquor at 30-35° C. about 15% $Na_2O$, or slightly more. Further treatment of caustic borate with this mother liquor results in the production of tetrahydrate sodium metaborate, while further enriching the solution with respect to free NaOH.

The extent to which this reaction may be carried is usually dependent upon the relative and absolute concentration of the $Na_2O$ and $B_2O_3$ desired in the resulting liquid caustic. It may be carried to the extreme just mentioned above, i. e., to the saturation point of the hydrated $Na_4B_2O_5$, or $NaOH\cdot H_2O$, or it may be quitted, for example, when the concentration of NaOH in the solution reaches approximately 35%. At this point the solution will hold a minimum of $Na_2B_2O_4$ at 20% C.

We will set forth, for illustration, examples wherein a strong caustic liquor and a crop of sodium metaborate tetrahydrate is produced from a suitable caustic borate. The caustic borate used in this example corresponded generally with the composition of point 21 of Figures 1 and 3, i. e., it was a low melting caustic borate containing a fairly high ratio of $Na_2O/B_2O_3$ and an appreciable percentage of unreacted sodium carbonate. It had the following composition:

|  | Percent by weight |
|---|---|
| $Na_2B_2O_4$ | 49.3 |
| $Na_2O$ | 29.7 |
| $Na_2CO_3$ | 21.0 |

About 20,000 pounds of this material is dissolved in 2,400 gallons of water, the final mixture being at 90-100° C. At this temperature all of the caustic borate goes into solution, leaving the greater part of the unreacted sodium carbonate in suspension. This residue is removed from the solution and may be returned to the aforedescribed process for manufacturing caustic borate.

Figure 4:
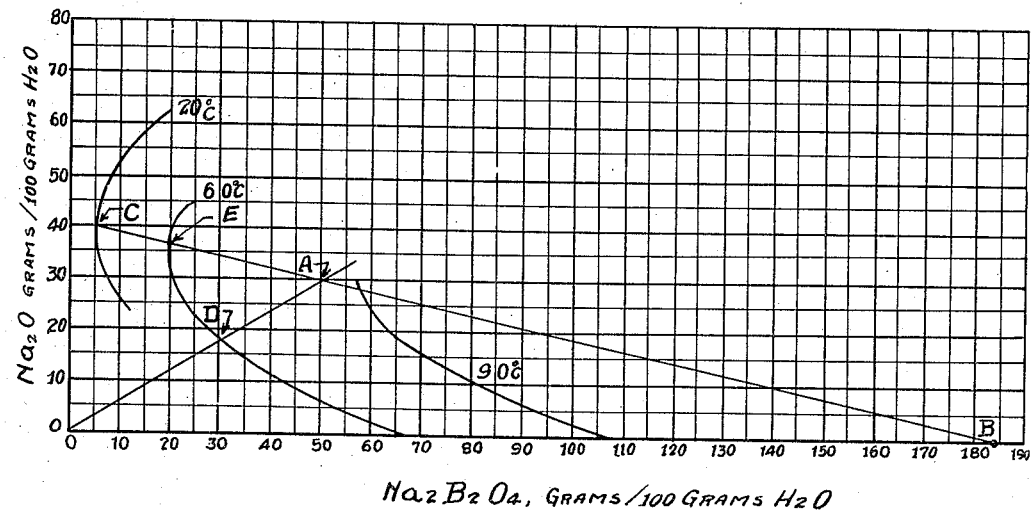

Referring now to Figure 4, we have plotted a portion of the solubility data of the system $Na_2O$—$B_2O_3$—$H_2O$, as this system is involved in the crystallization of $Na_2B_2O_4\cdot4H_2O$. Each curve of Figure 4 shows the isothermal change in solubility of the solid phase $Na_2B_2O_4\cdot4H_2O$ with change in free-$Na_2O$ concentration. Curves for 20° C., 60° C., and 90° C. are shown. The solubility of sodium carbonate, and its effect upon the other solubilities, is small and has for simplicity been omitted in this instance. When the above caustic borate is dissolved in water at 90-100° C., the composition travels along the line O—A. In this instance, an excess of caustic borate was not added, and, therefore, the composition A represents an unsaturated solution with respect to $Na_2O$ and $Na_2B_2O_4$ at 90-100° C. The point B represents the composition of $$Na_2B_2O_4\cdot4H_2O$$

in terms of grams of $Na_2B_2O_4$ per 100 grams of water.

The clear hot liquor prepared above is now cooled, in a suitable crystallizer, to 20° C. At this temperature there is precipitated 14,100 pounds of sodium metaborate tetrahydrate, which is then separated from the caustic liquor. We prefer to centrifuge this crop of crystals, precautions being taken, of course, to prevent splashing and atomization of the caustic liquor to the detriment of the operator. After separating the caustic mother liquor, the metaborate tetrahydrate crystals may be given a light wash with hot water, say at 70° C., and this wash water may be used in the treatment of a new batch of caustic borate. The crystals of sodium metaborate tetrahydrate are then dried and otherwise prepared for marketing.

The cooling operation abstracts water from the solution due to the precipitation of hydrated crystals. This amounts to a concentration of the solution with respect to sodium hydroxide. Referring to Figure 4, the path or mechanism of this action is illustrated by the line B—C. By projecting a line from point B through point A, the change in free-$Na_2O$ or concentration of the liquor, as $Na_2B_2O_4\cdot4H_2O$ is crystallized is graphically depicted. Thus, it may be seen that the cooling and crystallization of the metaborate tetrahydrate produced the mother liquor of composition C on the 20° C. solubility curve of $$Na_2B_2O_4\cdot4H_2O.$$

This liquor contains, neglecting the small $Na_2CO_3$ concentration, 35.3% NaOH and only 3.4%

$$Na_2B_2O_4.$$

We have found that the solubility of $Na_2B_2O_4$ at 20° C. is a minimum when the $Na_2O$ concentration lies between 35 and 45 grams per 100 grams of water. Such minima have been found, within ordinary cooling ranges, always to occur in the field of stability of $Na_2B_2O_4\cdot4H_2O$, and are depicted on Figure 4. We take advantage of this minimum $Na_2B_2O_4$ solubility in the preparation of sodium metaborate tetrahydrate and liquid caustic from our caustic borate melts.

There results from the foregoing operations 21,700 pounds of 35% liquid caustic. This 35% NaOH liquid caustic is a valuable commodity as produced. It may be further concentrated or treated for the production of other caustic products.

In the foregoing example, we described the removal of the crystallized sodium metaborate in terms of preparing it for marketing. However, in certain instances, the desire for caustic liquor is greater than the desire for sodium metaborate, per se. In such instances, the crystallized sodium metaborate may be mixed with further quantities of sodium carbonate and the mixture returned to fusion operations for again producing caustic borates. In this manner, we establish a cycle whose net effect is the production of caustic liquor from sodium carbonate, a small amount of borax being added to the cycle to replenish the obvious losses.

In case it is not desired to separate the unreacted sodium carbonate from the metaborate crop, another variation may be practiced. In this example, we illustrate another instance wherein we take advantage of the instability of the caustic borate in water. Caustic borate is added to water in such quantities that the $Na_2B_2O_4$ solid phase will exceed saturation, i. e., will not all dissolve. This may be illustrated by point D on the 60° C. solubility curve of Figure 4. Further addition of caustic borate to the aqueous system causes a disintegration of the caustic borate, the $Na_2O$ content passing into the solution along the curve until some point, such as E, is reached while increasing the quantity of hydrated metaborate in the sludge. The mixture whose liquid phase corresponds with point E may then be cooled to 20° C. if desired, and the crop of hydrated metaborate and unreacted sodium carbonate removed. These solids may be returned to the fusion process. In this example chosen for illustration of this principle, the quantities and yields are approximately the same as the foregoing example, almost the same quantity and quality of liquid caustic being produced.

The foregoing examples are just two of many possible variations for producing caustic liquor from caustic borate. One skilled in such matters, having been shown the way by this disclosure, will, by use of published solubility data, appreciate a number of obvious variations.

Throughout this disclosure, we have described the fusion reaction as taking place between borax or a caustic borate and sodium carbonate to produce a more caustic borate. Soda ash, i. e., commercial $Na_2CO_3$ has been specified, because it is the most common form. The process is workable, however, when other forms of carbonate of soda are employed. Such other forms may include the various hydrated forms of $Na_2CO_3$, and also the more acid forms, such as trona and sodium bicarbonate. Due to the similar solubility characteristics of sodium bicarbonate and trona with that of borax, it often occurs that there is obtained a product from a process which may contain considerable quantities of both borax and an acid sodium carbonate. Such mixtures may be employed in the fusion processes described herein.

Likewise, while we have mentioned specifically the use of borax, $Na_2B_4O_7.10H_2O$, any of its less hydrated forms may be successfully substituted.

If the tetrahydrate metaborate produced in the examples above is not a desired product, it may be recrystallized from fresh water, or from a solution suitably low in "impurities" (such as NaOH) yielding a further crop of the commoner octohydrate metaborate. The mother liquor from this recrystallization may be held for this recrystallization step (with borax neutralization, if desired), or it may be utilized for treating new quantities of caustic borate.

While the particular process herein described and the products resulting therefrom are well adapted to carry out the objects of the present invention, the invention is not limited to the particular process or products described, but includes all such modifications and changes as come within the scope of the appended claims.

We claim:

1. A process of making sodium metaborate, which comprises first fusing sodium tetraborate and sodium carbonate in proportions to secure a caustic borate substantially more alkaline than metaborate, dissolving such caustic borate, adding sodium tetraborate to the solution, and cooling the solution to precipitate sodium metaborate.

2. A process of making sodium metaborate, which comprises first fusing sodium tetraborate and sodium carbonate in proportions to produce a fused caustic borate having a greater alkalinity than sodium metaborate, then dissolving the caustic borate product in a caustic liquor, adding sodium tetraborate to said liquor, precipitating sodium metaborate from the liquor, and using the residual mother liquor as the liquor for dissolving the caustic borate.

3. A process of making sodium metaborate, which comprises fusing sodium tetraborate and sodium carbonate together to produce a fused product having a ratio of $Na_2O/B_2O_3$ greater than 1 to 1, and containing undecomposed sodium carbonate, dissolving the caustic borate of said product in a mother liquor from the previous operation and precipitating said free sodium carbonate, adding sodium tetraborate to the solution, precipitating sodium metaborate from the solution and using the mother liquor to dissolve additional fused caustic borate material.

4. A process of producing sodium metaborate, which comprises first forming a caustic borate product having a ratio of $Na_2O/B_2O_3$ greater than 1 to 1 by fusing sodium tetraborate and sodium carbonate together, adding such fused caustic borate to a solution sufficiently alkaline to precipitate uncombined sodium carbonate which may be present in said caustic borate, then adding to the solution sufficient sodium tetraborate to neutralize the caustic in said caustic borate, which was in excess of that required for sodium metaborate, to sodium metaborate, then crystallizing sodium metaborate octohydrate from the solution.

5. In the production of caustic borates having a ratio of $Na_2O$ to $B_2O_3$ between 3:2 and approximately 2:1 by the fusion of a boron compound free of any substantial quantity of borates other than sodium and carbonate of soda, the improvements which comprise effecting the fusion at a temperature from 950 to 1000° C. and employing an excess of carbonate so that the fused product will contain between 2 and 4 mol per cent of $Na_2CO_3$.

6. In the production of caustic borates from boron compounds free of any substantial quantity of borates other than sodium by fusion, the improvements which comprise treating said boron compound with an excess of carbonate of soda, over that required stoichiometrically to form a composition having a $Na_2O:B_2O_3$ ratio of from approximately 2 to 2.25, of from 19-30 mol per cent, expressed as $Na_2CO_3$, and maintaining the reaction temperature at least as high as 950° C.

7. In the production of caustic borates by fusion of sodium borate and carbonate of soda, the improvement which comprises treating sodium borate and carbonate of soda at fusion under a pressure below atmospheric whereby the mixture undergoing fusion is in contact with the low partial pressure of carbon dioxide.

8. The process of producing caustic borates having high $Na_2O:B_2O_3$ ratios which comprises reacting sodium borate and an excess of carbonate of soda at a temperature above 950° C. and under a pressure below atmospheric whereby the mixture undergoing fusion is in contact with the low partial pressure of carbon dioxide.

9. The process of producing caustic borates which comprises fusing sodium borate and an excess of carbonate of soda at a temperature appreciably above 950° C. until a portion of the liberable $CO_2$ has been removed and the final portion at least of such treatment taking place under a pressure below atmospheric whereby there is maintained but a low pressure of carbon dioxide present.

10. The method of producing a caustic soda solution which comprises fusing sodium borate and an excess of carbonate of soda to produce a fused caustic borate, extracting said fused borate with a hot alkaline solution to dissolve caustic soda and precipitate a mixture of sodium metaborate and carbonate of soda, returning such mixture to the fusion step for the production of additional caustic borate, and cooling the solution to crystallize sodium metaborate and produce a caustic soda mother liquor.

11. The method of extracting caustic from caustic borates which comprises leaching said caustic borate with a hot alkaline solution saturated in alkali metaborate and unsaturated in alkali hydroxide to dissolve caustic and form a solution having a ratio of $Na_2O$ to $B_2O_3$ greater than exists in either the starting caustic borate or the starting solvent and leave alkali metaborate.

12. The method of treating caustic sodium borates containing sodium carbonate produced by fusion of sodium borate and carbonate of soda which comprises leaching said borate with a hot alkaline solution containing sodium hydroxide and saturated with sodium metaborate to form a solution having a ratio of $Na_2O$ to $B_2O_3$ greater than exists in either the starting caustic borate or the starting solvent and leave a mixture of sodium metaborate and sodium carbonate.

13. A process of making sodium metaborate which comprises fusing sodium borate and carbonate of soda in proportions of greater carbonate than required by the stoichiometric equivalents to form sodium metaborate and producing a sodium borate more alkaline than sodium metaborate, leaching such borate to form an aqueous solution, neutralizing such borate to sodium metaborate by treatment with boric oxide compound free of any substantial quantity of borates other than sodium and being more acid than sodium metaborate and recovering sodium metaborate values from the solution.

14. A process of making sodium metaborate, which comprises first fusing sodium tetraborate and sodium carbonate in proportions to secure a caustic borate substantially more alkaline than metaborate, then dissolving such caustic borate, adding a sodium borate more acid than sodium metaborate to the solution, and cooling the solution to precipitate sodium metaborate.

15. In the production of sodium metaborate from caustic borates produced by fusion of sodium borate with carbonate of soda, dissolving the fused caustic borate in a caustic soda solution and preferentially precipitating sodium carbonate by increasing the temperature of the solution, and separating the solution from the precipitated sodium carbonate.

CHARLES F. RITCHIE.
LEROY G. BLACK.